(12) United States Patent
Lannestedt

(10) Patent No.: US 7,154,093 B2
(45) Date of Patent: Dec. 26, 2006

(54) IR CAMERA

(75) Inventor: Tomas Lannestedt, Alvsjo (SE)

(73) Assignee: Flir Systems AB, Danderyd (SE)

( * ) Notice: Subject to any disclaimer, the term of this patent is extended or adjusted under 35 U.S.C. 154(b) by 271 days.

(21) Appl. No.: 10/812,925

(22) Filed: Mar. 31, 2004

(65) Prior Publication Data

US 2004/0196372 A1 Oct. 7, 2004

(30) Foreign Application Priority Data

Mar. 31, 2003 (SE) .................................. 0300911

(51) Int. Cl.
*G02F 1/01* (2006.01)
(52) U.S. Cl. .................................... 250/330
(58) Field of Classification Search ................ 250/330, 250/316.1
See application file for complete search history.

(56) References Cited

U.S. PATENT DOCUMENTS 4,651,002 A * 3/1987 Anno ...................... 250/336.1
5,005,083 A    4/1991 Grage et al.
5,045,937 A * 9/1991 Myrick ........................ 348/144
5,637,871 A * 6/1997 Piety et al. .................. 250/330
2001/0046367 A1* 11/2001 Shimizu ........................ 386/46

FOREIGN PATENT DOCUMENTS

WO    WO 02/091741    11/2002

* cited by examiner

*Primary Examiner*—David Porta
*Assistant Examiner*—David S. Baker
(74) *Attorney, Agent, or Firm*—Young & Thompson

(57) ABSTRACT

An IR camera and a DV processing unit are disclosed which enable a user to use a standard DV recorder to record an IR film sequence and be able to play it back at a later time, and edit it, without using dedicated software. At the same time, the user has access to calibration data, enabling him the selection of data and processing of the film using dedicated software. This is achieved by including additional data related to the image processing in the signal, preferably in the part of the signal normally reserved for audio information.

9 Claims, 3 Drawing Sheets

IR CAMERA

TECHNICAL FIELD

The present invention relates to an infrared (IR) camera as defined in the preamble of claim 1.

BACKGROUND

It is of great interest, for example, to be able to process images taken by infrared (IR) cameras. IR cameras are used to capture images showing the temperature of different objects, or parts of objects, in a view. Such thermal images are used, for example, when searching for defects in devices, since defect parts of devices are often heated before they break.

An IR camera typically captures information of temperatures from about −60 degrees Celsius to about 2000 degrees Celsius. This range is called the thermal camera dynamic range. Typically, thermal images will show the background ambient temperature and some hot or cold objects that will be subject of the inspection. Background ambient temperature will vary from outdoor winter temperature to a hot summer day temperature. The inspected object (a thermal anomaly) differs from the background as a hotter or cooler object within or outside the typical background range. Thus, the thermal images will comprise a much smaller range than the thermal camera dynamic range. The images, or sequence of images, could be prepared from only this smaller temperature range and then be delivered, for example, to a customer. This is a common way of handling temperature images today. The images taken by infrared cameras are therefore processed by the image provider and then transferred to customers as a view where only a part of the initially captured data are shown.

The customer will typically want to display the IR image sequence, for example, on a television or a computer. A problem with this is that this view cannot be further processed by the customers. The customer may wish to select other parts of the image than those selected by the provider of the image. Also, if the temperature span for visualizing the background is set to, for example, 20–40 degrees Celsius, extreme events, such as a hot spot (a thermal anomaly such as an overheated electric conductor) or an explosion, will saturate in the image thermal range and not be shown in the image.

OBJECT OF THE INVENTION

It is an object of the present invention to enable the display of IR images on a standard DV television set, or record it to a standard DV recorder, while enabling the retrieval of temperature information from the images.

SUMMARY OF THE INVENTION

The object is achieved according to the invention by means of an IR camera comprising
- registration means for registering radiation from an area, or object,
- conversion means for receiving a signal corresponding to the registered radiation from the registration means,
- DV conversion means for converting the signal to a standard DV format and feeding it to a linklayer module,
- physical layer means for transmitting the converted signal, said IR camera being characterized in that it comprises
- additional data means for providing additional data related to the image processing, for inclusion of said additional data in the signal to be transmitted by the physical layer means.

The object is also achieved by a DV processing unit comprising
- receiving means for receiving a DV stream, said DV stream comprising at least one IR image and calibration data
- sampling means for forwarding each frame to a DV decoder and to an extraction means for extraction of calibration data from the DV stream,
- calculating means arranged to receive the DV stream from the sampling means and calibration data from the extraction means and processing the at least one IR image on the basis of the calibration data,
- storage means for receiving the converted image from the calculating means and storing it.

With the IR camera according to the invention the user can use a standard DV recorder to record an IR film sequence and be able to play it back at a later time, and edit it, using standard software. At the same time, the user has access to calibration data, enabling him the selection of data and processing of the film, using dedicated software, for example, for measuring the temperature.

Preferably, the physical layer means of the IR camera, and the receiving means of the DV processing unit are adapted to the FireWire standard using 32 kHz 2-ch mode.

The physical layer means of the IR camera may also be adapted to use the whole audio channel instead of just a part of it. This increases the capacity for transmitting additional data.

The additional data means of the IR camera is preferably arranged to provide said additional data related to the image processing in the part of the signal normally reserved for audio information. In this case, the extraction means of the DV processing unit is arranged to extract said additional data related to the image processing from the part of the signal normally reserved for audio information.

Alternatively, the calibration data can be provided as part of the image data. The calibration data can be included with the image data in any part of the image but preferably near the edges, that is, in the top and/or bottom lines and/or on the sides of the image. If the calibration data is arranged in lines, 7 lines of the image will typically be needed. If the calibration data is arranged in columns, approximately 10 columns will be needed.

The compression of data normally performed will destroy the calibration data. This may be compensated for in various ways, each involving the use of more bits for the calibration data. Alternatively the data can be grouped according to look-up tables for the colouring in order to facilitate the reconstruction of data with an acceptable precision.

Data that is identical for a number of images can be provided in a dummy image to reduce the amount of calibration data needed for each image.

Said object is also achieved according to the invention by a computer program product for use in an IR camera comprising means for outputting a DV signal comprising at least one image, said computer program when run in the IR camera causing the IR camera to perform the following steps:
- retrieving calibration data stored in a memory means in the IR camera including said calibration data in the DV output signal This computer program product is preferably arranged to include said calibration data in the part of the DV output signal normally reserved for audio data.

Said object is also achieved according to the invention by a computer program product for use in a DV processing unit, which, when executed in the DV processing unit will cause the following procedure to take place:
- extraction of calibration data from an incoming DV stream comprising at least one IR image,
- processing of the at least one image on the basis of the calibration data,
- storage of the converted image.

This computer program product is preferably arranged to extract the calibration data from the part of the signal normally reserved for audio information.

DETAILED DESCRIPTION OF EMBODIMENTS

Figure 1:
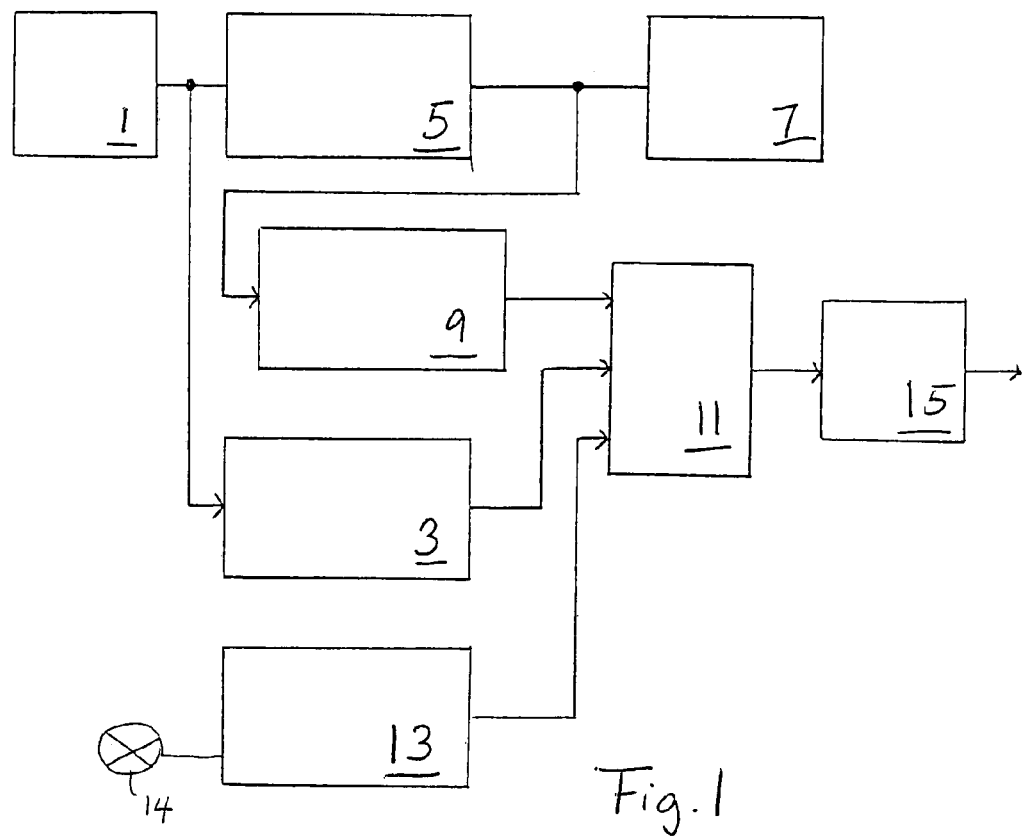
FIG. 1 shows an IR camera according to the invention.

FIG. 1 shows an IR camera according to the invention. As is common in IR cameras, the inventive IR camera comprises an IR detector 1 for registering the radiation from an area, or object. From the IR detector 1 the registered radiation data is forwarded to a calculating unit 3 which performs radiometric calculations on the data, i.e. calculates the temperature in each part of the registered area on the basis of the registered radiation.

A transforming unit 5 receives the signal from the IR detector 1 and converts it to the video standard format CCIR/ITU 601-2/656, also called 4:2:2, to match standard television timing output. The converted signal is sent to a display 7 on the IR camera. The converted signal is also sent to a DV compression unit 9, which converts it to a standard compressed DV format and feeds it to a linklayer module 11.

Typically, but not necessarily, the linklayer module 11 also receives audio data from an audio unit 13 comprising or connected to a microphone 14, amplifier and a digital codec.

The linklayer unit 11 combines the DV format data received from the DV compression unit 9, including digital synchronization data with audio data received from the audio unit 13. From the linklayer module 11 the combined signal is transmitted to the physical layer, represented by a 1394 PHY unit 15 and from this unit on a Firewire connection to a DV recorder (not shown).

To be able to get temperature readouts from IR images, a calculating unit 3 is introduced according to the invention. The calculating unit 3 is connected to the IR detector 1 from which it receives additional data acquired by the IR camera electronics. These additional data are used by the temperature calculating unit 3, together with the IR images themselves. The additional data comprise calibration constants, registration of background radiation from temperature sensors in the camera and possibly other types of data. These data are gathered in containers as the one shown in FIG. 5. One container is used per image. The containers are sent to the link layer module 11 which divides each container into fragments that are added to the DV stream as discussed in connection with FIG. 3. In the prior art these additional data are not available.

According to the invention, this data is included in the signal transmitted from the 1394 PHY unit 15. Normally, the bandwidth is shared between header information, video information and audio information as explained in connection with FIG. 2. The invention uses the fact that the DV standard allows the use of some of the bandwidth normally used for audio data for other types of data if needed. Reducing the audio bandwidth of course lowers the quality of the audio data, which is, however, still acceptable. At the same time the bandwidth not used for audio data can be used to transfer additional data such as calibration constants and background radiation from temperature sensors in the camera. This additional data can be used by a temperature calculating unit located, for example, in a processing means in a computer on which the IR film sequence is stored, to calculate temperature information which may be presented to the user.

The additional data will be part of the signal adhering to the DV standard, which means that any intermediate apparatuses will handle the signal as a standard DV signal. The DV signal will be recorded and received by all standard DV equipment. When played or received by a computer, a standard DV driver will extract audio data and video data and display these data to the user. The user can use standard editing software tools to cut out interesting parts from the IR film sequence and store them. Since DV frames are solid state, i.e. they do not rely on information from previous frames and every frame will be filled with IR calibration information, the IR DV film sequence will not be destroyed if it is edited at a later time.

With a dedicated software driver and dedicated software applications, termperature readouts from the DV film sequences can be calculated into temperature data, which may be displayed to the user.

As an example, consider the use of the 32 kHz DV audio mode referred to in the DV standard as "SD-2ch audio mode". By switching this mode into "Locked mode" to synchronize audio and video, 2160 bytes of proprietary data will be available running NTSC TV mode. Alternatively, running PAL TV mode 2592 bytes will be available. The locked mode ensures that available data bytes will be synchronized, meaning that the link layer will place them in the currently generated DV video frame.

The FireWire standard enables four different audio modes. Apart from the 48 kHz 1 channel mode where all the available bytes are used for sound information, only the 32 kHz 2 channel mode supports "locked mode", that is, synchronizing the sound, and according to the invention, the IR data, with each image. According to the invention locked mode is needed to ensure correct interpretation of each image. Therefore, at present, the 32 kHz 2 channel mode must be used according to the invention unless a proprietory solution is developed. Alternatively the full audio channel may be used for additional data. This alternative also requires that a synchronization mechanism be added as a part of the calibration data or in some other way.

When sending DV with embedded IR calibration data over IEEE1394 (commonly referred to as FireWire), one DV frame (one single image) will be divided into 250 valid VDC packages, that is, not counting the additional null package that is sent for every 15$^{th}$ package. A proprietary driver software collects the 250 valid DVC packages and assembles them into a full DV frame 21 as shown in FIG. 2.

Figure 2:
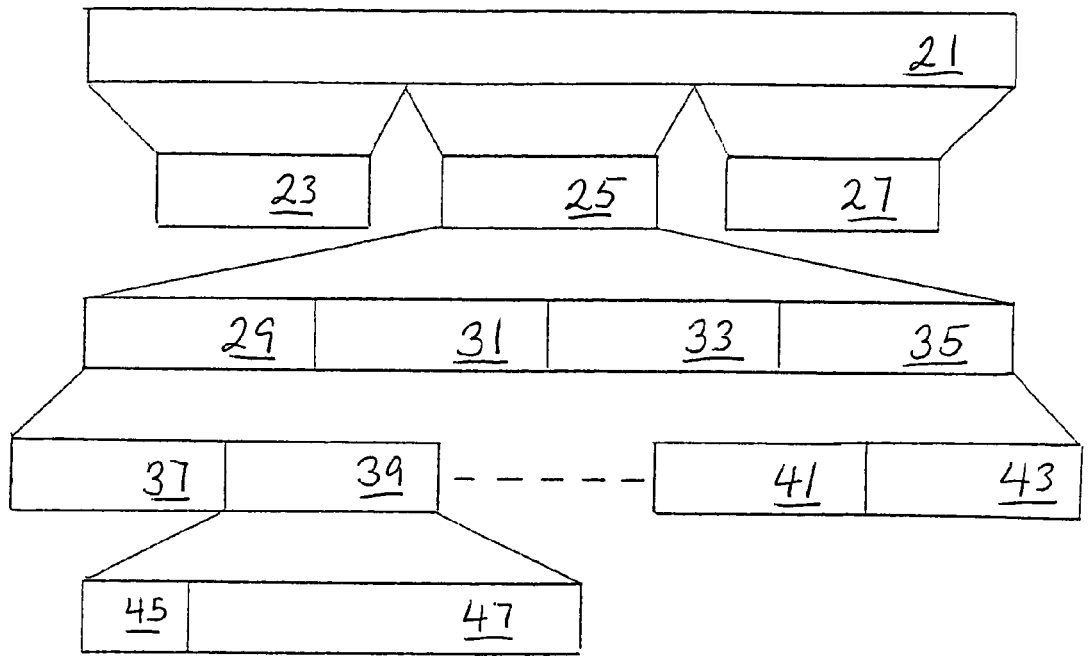
FIG. 2 shows the structure of one Digital Video (DV) frame 21.

FIG. 2 shows the structure of one Digital Video (DV) frame 21. The frame 21 consists of 10 or 12 DIF sequences, although only three DIF sequences 23, 25, 27 are shown in FIG. 2. Each DIF sequence comprises a header section 29, a subcode section 31, a VAUX section 33 and an audio and video section 35. Each DIF sequence is divided into 150 DIF blocks 37, 39, 41, 43, holding the sequences 29–35. Each DIF block 37–43 has an ID field 45 and a data field 47. The first six DIF blocks in a DIF sequence comprise header information. The remaining 144 DIF blocks are organized in an array of 9×35 blocks, where the blocks of the first column of blocks are normally dedicated to audio data and the rest are dedicated to video. According to the invention, however, some of the blocks dedicated to audio data are used to carry other types of data.

Figure 3:
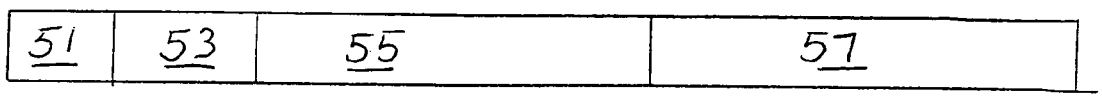
FIG. 3 shows one audio block, used according to the invention, assuming that the 32 kHz "SD-2ch audio mode" is used.

FIG. 3 shows one audio block, used according to the invention, assuming that the 32 kHz "SD-2ch audio mode" is used. Of the 80 bytes in the block, a first field 51 comprising three (bytes 0–2) are used for identity information for the block. A second field 53 comprising bytes 3–7 are used for Audio Auxiliary AAUX. Normally bytes 8–79 would be used for audio data. According to the invention, however, a third field 55 comprising bytes 8–55 is used to carry audio data. The remaining field 57 comprising bytes 56–79 may then be used for other purposes. According to the invention, these bytes are used to carry data related to the IR image recording, such as calibration data.

Using the audio block as shown in FIG. 3 24 bytes for each audio block can be used for other purposes. As discussed in connection with FIG. 2, there are 9 audio blocks, which means that 216 bytes per DIF sequence can be used for other purposes. With NTSC TV mode, therefore, 2160 bytes in each frame can be used for other data such as IR calibration data. The capacity needed for IR calibration data would typically be around 1500 bytes, depending on the implementation.

Figure 4:
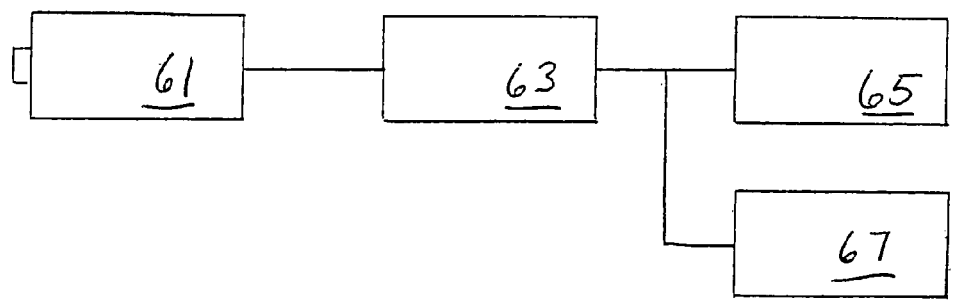
FIG. 4 shows a typical configuration for providing IR images on DV format.

FIG. 4 shows a typical configuration for providing IR images on DV format, for example, to customers. An IR camera 61 registers thermal data, converts it to a DV format image and forwards the image to a DV recorder 63. From the DV recorder the image can be forwarded to a computer 65, or displayed on a television screen 67. The DV recorder may be any type of DV recorder capable of receiving input data from an external unit, for example, on a FireWire connection. In addition to a standard DV recorder it may therefore be, for example a computer or a video camera having such capabilities, such as a standard hand-held or stationary DV video camera.

In the prior art, the forwarded image can only be displayed on the computer or TV screen, and only very simple editing can be done, such as selecting a sequence in time. According to the invention, however, the forwarded image can be subject to post processing. In the post-processing for each individual pixel a temperature can be calculated, which can in turn be analysed.

Figure 5:
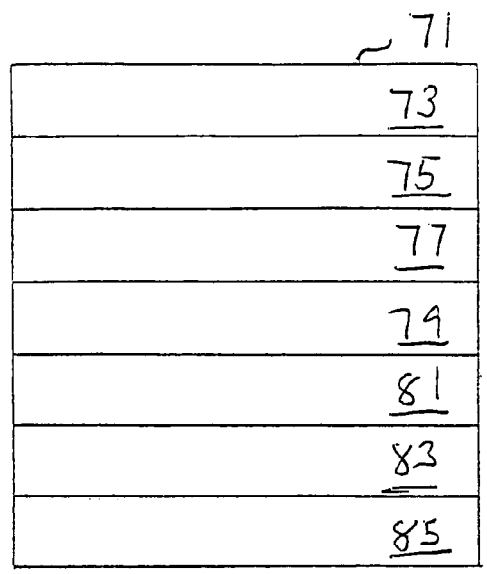
FIG. 5 shows a block of information structured according to an embodiment of the invention.

The software used in the computer to analyze the data provided according to the invention must be adapted to the structure of the data provided. This structure can be adapted to suit particular needs. FIG. 5 shows an example of such a structure. In this example, a data container 71 of 1500 bytes comprises linearization parameters 73, transmission parameters 75, temperature range 77, background radiation 79, colorization information 81, camera settings 83 and a time stamp 85. The container may also comprise other types of data, such as optical parameters (not shown), for example, concerning external supplementary optics. This container 71 is bundled onto the IRDV stream and can be retrieved by software at the receiving unit.

Figure 6:
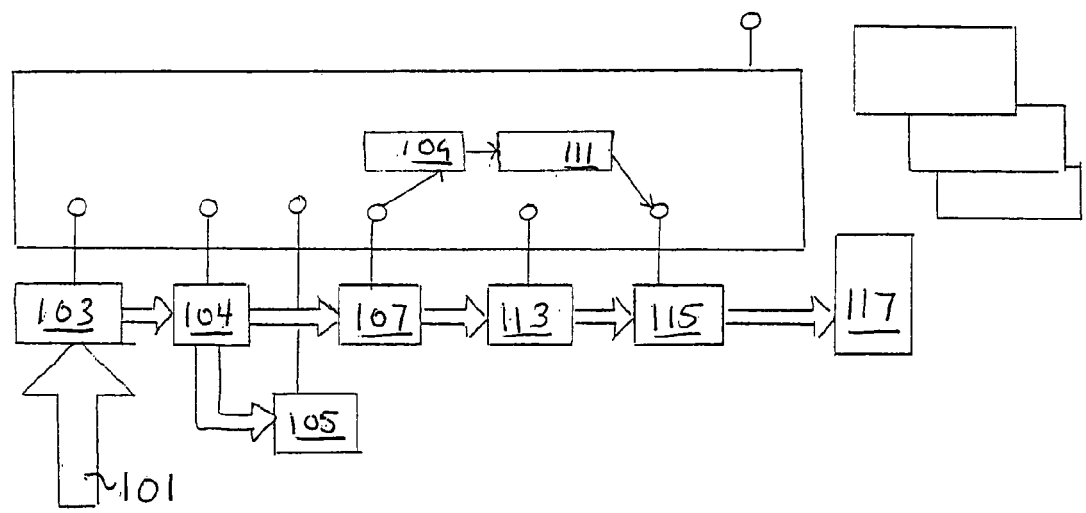
FIG. 6 shows an apparatus for receiving and processing an incoming DV stream, according to the invention.

Each audio block has a specified position in a frame, which means that identity information is not needed. To retrieve the data, the program first reads the first 56 audio DIF blocks of each frame. The program should check the audio source description of each frame to ensure that the audio mode is 32 kHz SD-2ch. According to one embodiment the media stream is controlled by a DCOM server FIG. 6 shows the reception and processing of the DV stream, for example, in a computer. Most of the units in FIG. 6 perform standard functions and are known to the skilled person. An incoming DV stream represented by an arrow 101 is received in a receiving unit 103 From the receiving unit 103 the DV stream is fed to a DV splitter 104 which divides the stream and transmits the audio information, that is, the fields 51, 53 and 55 shown in FIG. 3, to the sound renderer 105 and the whole DV frame to a sample grabber 107. The sample grabber 107 copies the incoming frames to an IR calibration data extractor 109 which extracts the calibration data, that is, the data shown as 57 in FIG. 3 and forwards it to a calculating unit 111. The calculating unit 111 uses the calibration data to set conditions for what should be viewed and how, for example, colorization of the IR image. From the sample grabber 107 the incoming frames are also forwarded to a DV decoder 113 as known in the art. From the DV decoder 113 the incoming frames are forwarded to a unit introduced according to the invention, known as a dedicated IR renderer 115. The IR renderer 115 also receives the conditions from the calculating unit 111 to use as control information when displaying the image. The IR renderer uses the colorization information 79 and other control information to do the following:

create a temperature related image to be displayed on the screen, colour the image using an appropriate algorithm for colorization and linearization, create numeric analysis information in the form of measurement values, and display analysis results graphically.

Ideally, every image in the DV stream is converted and stored in a separate file in a memory means 117.

The invention claimed is:

1. An IR camera comprising registration means (1) for registering radiation from an area, or object, conversion means (5) for receiving a signal corresponding to the registered radiation from the registration means (1), DV conversion means (9) for converting the signal to a standard DV format and feeding it to a linklayer module (11), physical layer means (15) for transmitting the converted signal, characterized in that it comprises additional data means (3) for providing additional data related to the image processing, for inclusion of said additional data in the signal to be transmitted by the physical layer means (15).

2. An IR camera according to claim 1, wherein the physical layer means is adapted to the IEEE 1394 standard using 32 kHz 2-ch mode.

3. An IR camera according to claim 1, wherein the physical layer means is adapted to use the whole audio channel.

4. An IR camera according to claim 2, wherein the additional data means is arranged to provide said additional data related to the image processing in the part of the signal normally reserved for audio information.

5. An IR camera according to claim 3, wherein the additional data means is arranged to provide said additional data related to the image processing in the part of the signal normally reserved for audio information.

6. DV processing unit comprising
- receiving means (103) for receiving a DV stream, said DV stream comprising at least one IR image and calibration data
- sampling means (107) for forwarding each frame to a DV decoder (113) and to an extraction means (109) for extraction of calibration data from the DV stream,
- calculating means (111) arranged to receive the DV stream from the sampling means (107) and calibration data from the extraction means and processing the at least one IR image on the basis of the calibration data,
- storage means for receiving the converted image from the calculating means and storing it,
- wherein the extraction means is rearranged to extract additional data related to the image processing from the part of the signal normally reserved for audio information.

7. A DV processing unit according to claim 6, wherein the receiving means is adapted to the IEEE 1394 standard using 32 kHz 2-ch mode.

8. A computer program product for use in an IR camera comprising means for outputting a DV signal comprising at least one image, said computer program when run in the IR camera causing the IR camera to perform the following steps:
- retrieving calibration data stored in a memory means in the IR camera
- including said calibration data in the DV output signal, and
- further arranged to include said calibration data in the part of the DV output signal normally reserved for audio data.

9. A computer program product for use in a DV processing unit, which, when executed in the DV processing unit will cause the following procedure to take place:
- extraction of calibration data from an incoming DV stream comprising at least one IR image,
- processing of the at least one image on the basis of the calibration data,
- storage of the converted image,
- wherein the extraction of calibration data is performed from the part of the signal normally reserved for audio information.

* * * * *